United States Patent
Goller et al.

(10) Patent No.: US 9,627,670 B2
(45) Date of Patent: Apr. 18, 2017

(54) BATTERY CELL AND METHOD FOR MAKING BATTERY CELL

(71) Applicant: Infineon Technologies AG, Neubiberg (DE)

(72) Inventors: Bernhard Goller, Villach (AT); Michael Sorger, Villach (AT); Magdalena Forster, Villach (AT); Katharina Schmut, Egg am Faaker See (AT)

(73) Assignee: Infineon Technologies AG, Neubiberg (DE)

( * ) Notice: Subject to any disclaimer, the term of this patent is extended or adjusted under 35 U.S.C. 154(b) by 130 days.

(21) Appl. No.: 13/955,221

(22) Filed: Jul. 31, 2013

(65) Prior Publication Data

US 2015/0037685 A1    Feb. 5, 2015

(51) Int. Cl.
H01M 2/16    (2006.01)
H01M 2/14    (2006.01)
H01M 10/0525    (2010.01)

(52) U.S. Cl.
CPC ......... *H01M 2/1673* (2013.01); *H01M 2/145* (2013.01); *H01M 2/1646* (2013.01); *H01M 10/0525* (2013.01); *H01M 2300/0085* (2013.01); *Y02P 70/54* (2015.11); *Y02T 10/7011* (2013.01); *Y10T 29/49108* (2015.01)

(58) Field of Classification Search
CPC ....... H01M 4/38; H01M 2/1673; H01M 2/145; H01M 2/1646; H01M 10/0525; H01M 2300/0085

See application file for complete search history.

(56) References Cited

U.S. PATENT DOCUMENTS

| | | | |
|---|---|---|---|
| 7,560,085 B2 * | 7/2009 | Farrell et al. ................. | 423/348 |
| 9,293,752 B2 | 3/2016 | Murata et al. | |
| 2004/0253512 A1 * | 12/2004 | Watanabe ............... | H01M 2/08 429/210 |
| 2006/0003217 A1 * | 1/2006 | Cohen ................... | H01M 8/006 429/428 |
| 2006/0102455 A1 * | 5/2006 | Chiang et al. ............... | 200/181 |
| 2006/0286456 A1 * | 12/2006 | Fu ......................... | H01M 2/166 429/231.1 |
| 2011/0053018 A1 * | 3/2011 | Morse ................. | H01M 8/0204 429/423 |

(Continued)

FOREIGN PATENT DOCUMENTS

WO    2013075810 A1    5/2013

OTHER PUBLICATIONS

Merriam-Webrster defiitions membrane accessed Mar. 10, 2016.*

(Continued)

*Primary Examiner* — Miriam Stagg
*Assistant Examiner* — Brian Ohara
(74) *Attorney, Agent, or Firm* — Eschweiler & Potashnik, LLC

(57) ABSTRACT

Embodiments provide a battery cell including a porous membrane, the porous membrane including transformed semiconductor material. The porous membrane separates a first half-cell from a second half-cell of the battery cell. The porous membrane comprises channels allowing ions and/or an electrolyte to move between the first half-cell and the second half-cell.

19 Claims, 4 Drawing Sheets

(56) References Cited

U.S. PATENT DOCUMENTS

2011/0070480 A1* 3/2011 Hahn ................ H01M 2/0207
429/162
2013/0128488 A1* 5/2013 Forster .............. H01M 10/0436
361/820

OTHER PUBLICATIONS

U.S. Appl. No. 13/653,493, filed Oct. 17, 2012. 68 Pages.
Gauthier-Manuel et al. "Nanostructured Membranes: A New Class of Protonic Conductor for Miniature Fuel Cells." Open Access Rewards System. Posted on Jul. 15, 2005. 8 Pages.
Chu, et al. "Porous Silicon Fuel Cells for Micro Power Generation." Journal of Micromechanics and Microengineering. Published on Aug. 31, 2007. 7 Pages.

* cited by examiner

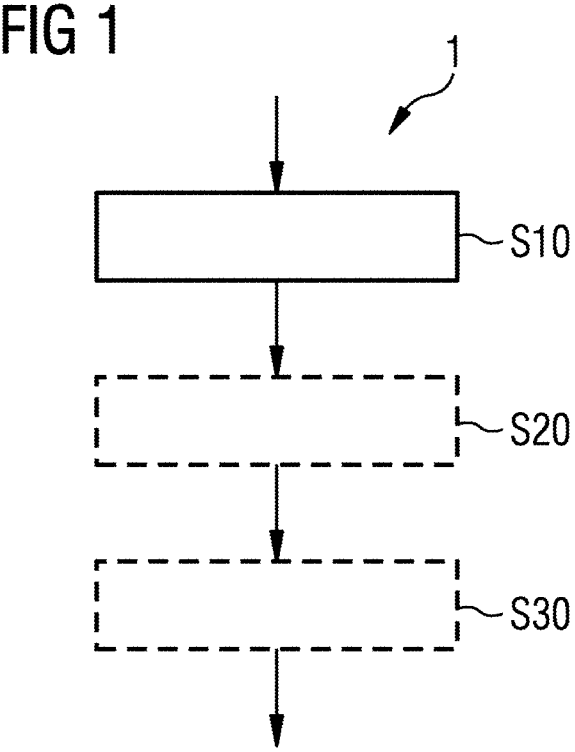

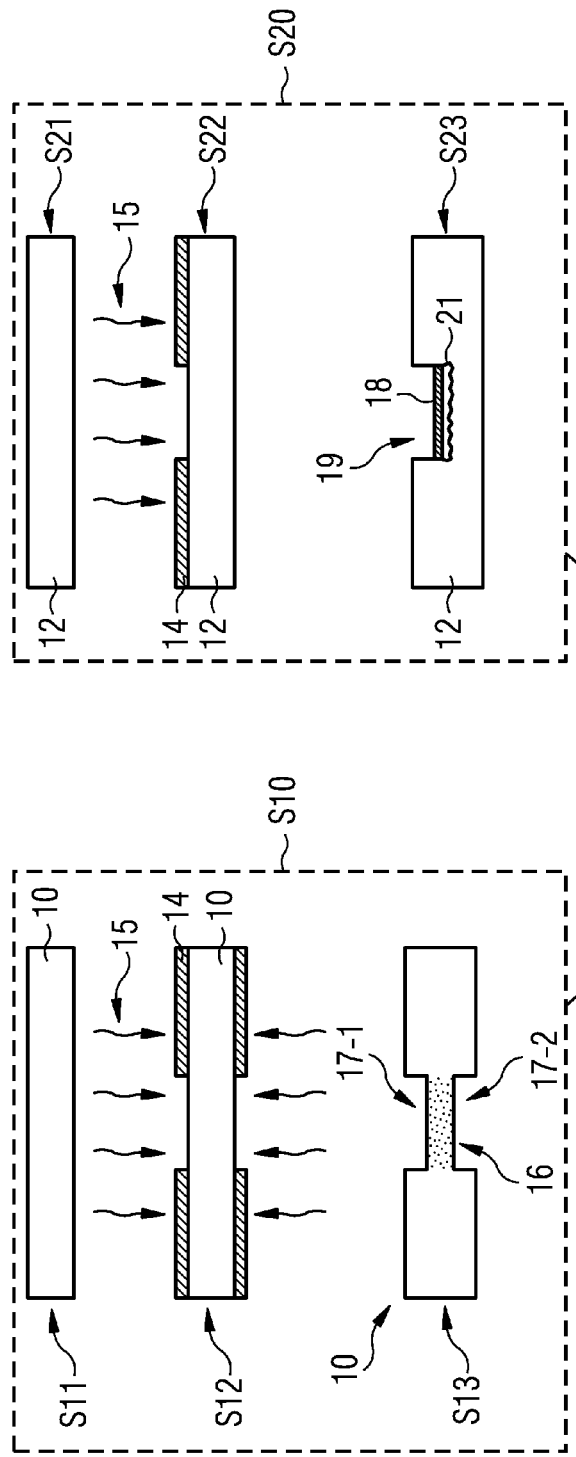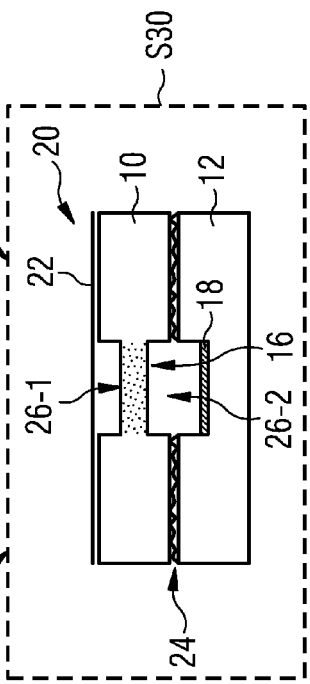

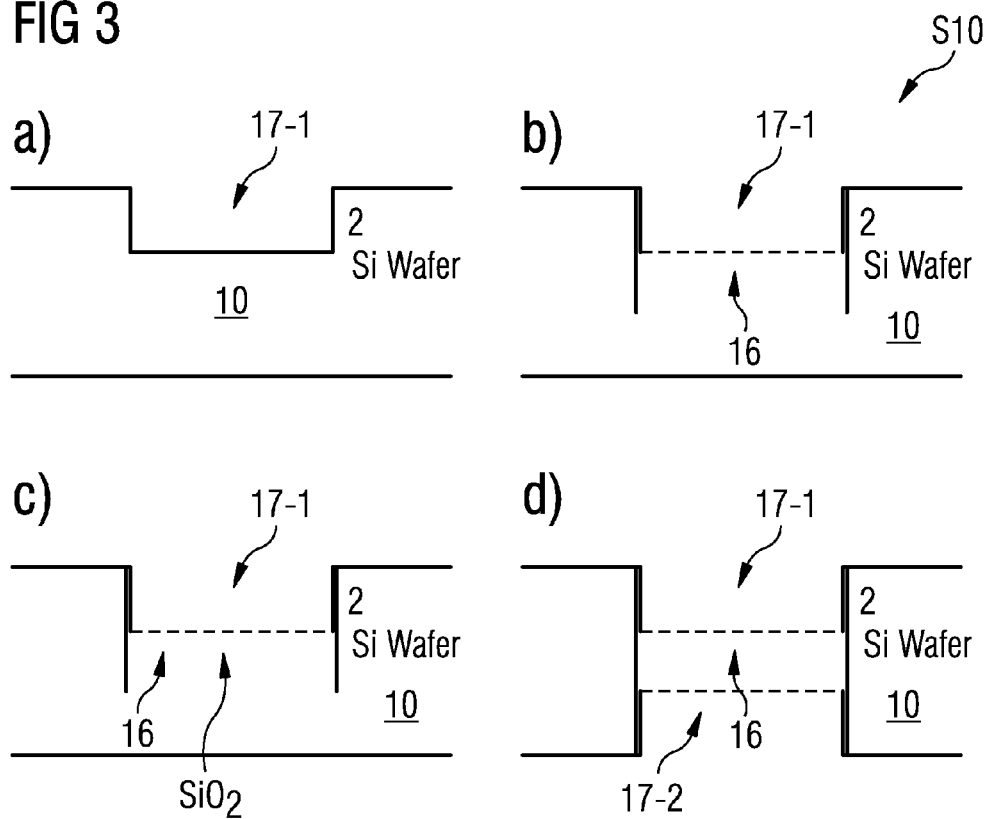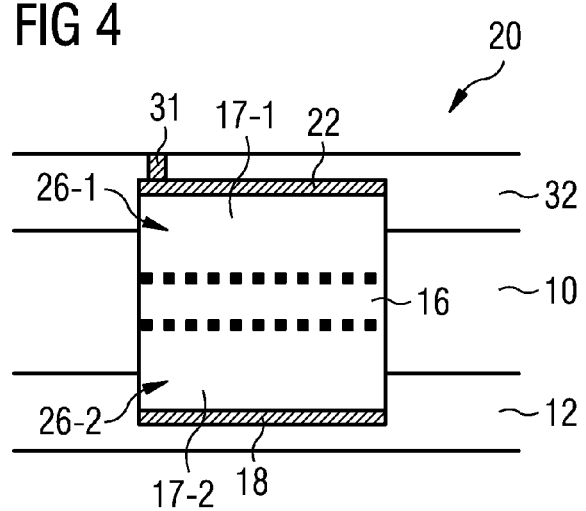

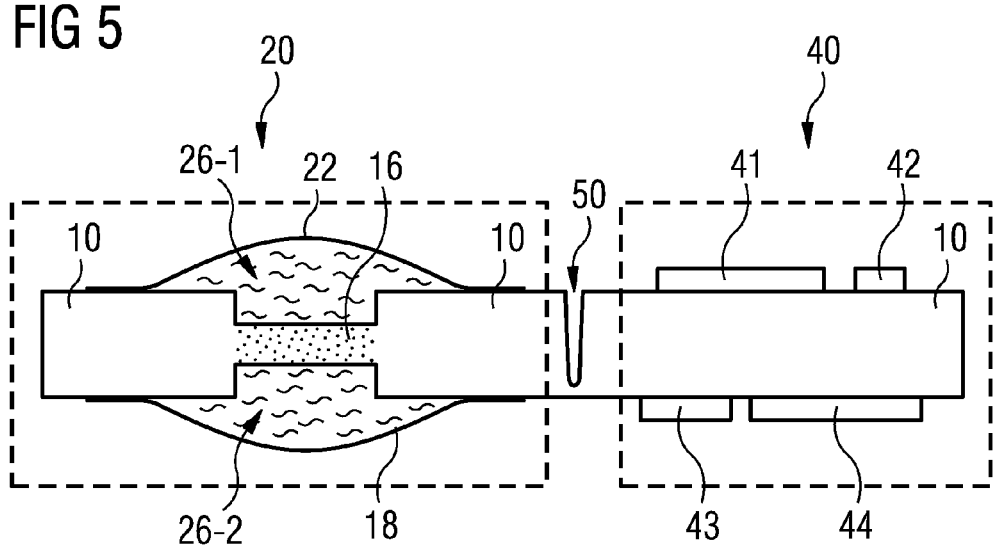
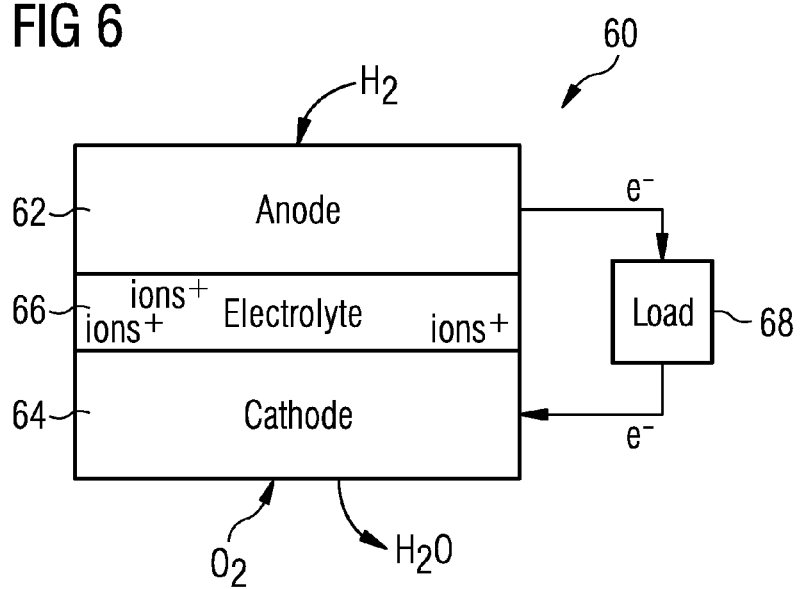

BATTERY CELL AND METHOD FOR MAKING BATTERY CELL

BACKGROUND

With the increased use of portable electronic devices such as notebooks, portable telephones, cameras and others and with the increased use of electrically-driven automobiles, secondary or rechargeable batteries with high energy density have received increasing attention as a power source for these devices. Examples of such rechargeable batteries are lithium ion rechargeable batteries.

Further, integrated circuits or electronic devices requiring a relatively low amount of electrical energy are increasingly used in many applications. Hence, it would be desirable to provide miniaturized batteries that can supply these integrated circuits or electronic devices with energy.

SUMMARY

According to a first aspect embodiments provide a method for providing or manufacturing a battery cell. The method comprises forming a porous portion of a semiconductor substrate. The porous portion provides or acts as a membrane for separating a first half-cell from a second half-cell of the battery cell. The membrane comprises channels allow ions and/or an electrolyte to move between the first half-cell and the second half-cell.

According to another aspect embodiments provide a method for providing a battery cell in a stack of a plurality of separate substrate layers. The method comprises forming at least a part of a first cavity corresponding to a first half-cell into a first surface of a first semiconductor substrate layer, such that a bottom of the first cavity is defined by substrate material below the first surface. A porous semiconductor material portion is formed into the bottom of the first cavity, such that the bottom of the first cavity is provided by the porous semiconductor material portion. At least a part of a second cavity corresponding to a second half-cell is formed into a second surface of the first substrate layer opposite the first surface, such that a bottom of the second cavity is provided by the porous semiconductor material portion. The porous semiconductor material portion provides a membrane for separating the first half-cell from the second half-cell of the battery cell. The membrane comprises channels allowing ions and/or an electrolyte to move between the first cavity and the second cavity. Further parts of the first half-cell and/or the second half-cell are formed in at least one further separate semiconductor substrate layer. The first semiconductor substrate layer and the at least one further separate semiconductor substrate layer are stacked to obtain the battery cell or at least parts thereof.

According to another aspect, embodiments relate to a battery cell. The battery cell comprises a porous portion of a semiconductor substrate. The porous portion provides or acts as a membrane for separating a first half-cell from a second half-cell of the battery cell. The membrane comprises channels allow ions and/or an electrolyte to move between the first half-cell and the second half-cell.

According to another aspect, embodiments relate to a method for making a battery cell, comprising transforming a semiconductor material into a porous membrane. The porous membrane is configured to separate a first half-cell from a second half-cell of the battery cell, and comprises channels that allow ions and/or an electrolyte to move between the first half-cell and the second half-cell.

According to another aspect, embodiments relate to a method for making a battery cell, comprising forming the porous membrane, which includes increasing the porosity of a semiconductor material. After increasing the porosity, the method further comprises oxidizing the semiconductor material.

According to another aspect, embodiments relate to a battery cell, comprising a positive electrode, a negative electrode, and a porous membrane between the positive and negative electrodes. The porous membrane comprises predominantly an oxidized semiconductor material. Further, an electrolyte is in contact with the positive electrode, the negative electrode and the porous membrane.

According to another aspect, embodiments relate to a method for making an electrochemical cell, comprising transforming a semiconductor material into a porous membrane, wherein the porous membrane is configured to separate a first half-cell from a second half-cell of the electrochemical cell. The porous membrane comprises channels that allow ions and/or an electrolyte to move between the first half-cell and the second half-cell. In one or more embodiments, the electrochemical cell may be a battery cell. In one or more embodiments, the electrochemical cell may be a fuel cell.

According to another aspect, embodiments relate to a method for making an electrochemical cell, comprising forming the porous membrane, which includes increasing the porosity of a semiconductor material. After increasing the porosity, the method further comprises oxidizing the semiconductor material. In one or more embodiments, the electrochemical cell may be a battery cell. In one or more embodiments, the electrochemical cell may be a fuel cell.

According to another aspect, embodiments relate to an electrochemical cell, comprising an anode, a cathode, and a porous membrane between the anode and cathode. The porous membrane comprises predominantly an oxidized semiconductor material. In one or more embodiments, the electrochemical cell may be a battery cell. In one or more embodiments, the electrochemical cell may be a fuel cell. In one or more embodiments, substantially all of the porous membrane may be an oxidized semiconductor material. In one or more embodiments, the oxidized semiconductor material may be silicon glass.

According to another aspect, embodiments relate to an electrochemical cell, comprising an anode, a cathode, and a porous membrane between the anode and cathode. The porous membrane comprises predominantly silicon glass. In one or more embodiments, substantially all of the porous membrane may be silicon glass. In one or more embodiments, the electrochemical cell may be a battery cell. In one or more embodiments, the electrochemical cell may be a fuel cell.

According to another aspect, embodiments, relate to a battery cell including a porous membrane, the porous membrane comprising a transformed semiconductor material. The porous membrane separates a first half-cell from a second half-cell of the battery cell. The porous membrane comprises channels allowing ions and/or an electrolyte to move between the first half-cell and the second half-cell. The transformed semiconductor material may be substantially inert to the attack by the ions and/or the electrolyte.

BRIEF DESCRIPTION OF THE DRAWINGS

Some embodiments of apparatuses and/or methods will be described in the following by way of example only, and with reference to the accompanying figures, in which FIG. 1 illustrates a flow chart of an example method for forming a battery cell and the resulting battery cell;

FIGS. 2a, 2b, and 2c illustrate a further embodiment of a method for forming a battery cell and the resulting battery cell;

FIG. 3 illustrates an embodiment of a process of forming a porous separator membrane into a first substrate;

FIG. 4 illustrates an embodiment of a battery cell integrated into a stack of separate semiconductor layers; and FIG. 5 shows battery cell coupled to an electrical circuit integrated in at least one of the separate layers of the stack forming the battery cell.

FIG. 6 shows a block diagram of an embodiment of a fuel cell

DETAILED DESCRIPTION

Various example embodiments will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like or similar elements throughout the description of the figures.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

The terms "carrier" or "semiconductor carrier" used in the following description may include any semiconductor-based structure that has a semiconductor surface. Carrier and structure are to be understood to include Silicon (Si), Silicon On Insulator (SOI), Silicon-On-Sapphire (SoS), doped and undoped semiconductors, epitaxial layers of silicon supported by a base semiconductor foundation, and other semiconductor structures. Further, the term "carrier" or "semiconductor carrier" further comprises any kind of semiconductor layer, which may be crystalline, polycrystalline or amorphous, which is formed on a suitable substrate material. In addition, the carrier may comprise an insulator. Specific examples comprise glass, e.g. quartz glass (for example, $SiO_2$), ceramics or polymers. Further, the term "substrate" may as well include any semiconductor-based structure that has a semiconductor surface. The semiconductor need not be silicon-based. The semiconductor could as well be silicon carbide, silicon-germanium, germanium, germanium, gallium nitride or gallium arsenide, for example. The substrate may comprise a semiconductor or an insulator. Specific examples comprise glass (for example, silicon oxide, $SiO_x$), ceramics or polymers.

The terms "connected" or "interconnection" as used within the context of the present specification mean that the respective components may be in signal connection to each other. For example, further elements may be disposed between the components. Further, the respective components need not be physically connected as long as signals may be exchanged between them. Moreover, the terms "connected" and "interconnection" also encompass the case in which, for example, a voltage is not applied.

Batteries comprise one or more battery cells. In one example, a battery may be a single battery cell. In another example, a battery may include a plurality of battery cells. The battery cells may be coupled together (e.g. electrical coupled together). The battery cells may be electrically coupled together in series and/or parallel configurations. A battery cell may be a primary battery cell which is not rechargeable. A battery cell may be a secondary battery cell which is a rechargeable battery cell. A battery may be a primary battery comprising one or more primary battery cells which are not rechargeable. A battery may be a secondary battery comprising one or more secondary battery cells which are rechargeable. A battery cell may also be referred to as a galvanic cell.

A battery (e.g. a battery cell) may derive electrical energy from spontaneous redox reaction taking place within the cell. A battery cell is an example of an electrochemical cell.

Another example, of an electrochemical cell is a fuel cell. In contrast to a battery cell, a fuel cell may not run down or require recharging. It may operate as long as the fuel and an oxidizer are supplied continuously from outside the cell. A fuel cell may convert the chemical energy from a fuel into electricity through a chemical reaction with oxygen or another oxidizing agent. Hydrogen is an example of a fuel. Hydrocarbons such as natural gas and alcohols like methanol may also be used. Fuel cells may require a constant source of fuel and oxygen/air to sustain the chemical reaction. They may be able to produce electricity as long as these inputs are supplied. It is understood that the ideas presented herein, while discussed in terms of battery cells, are also applicable to other forms of electrochemical cells such as, for example, fuel cells.

A battery cell may comprise two different metals connected by a salt bridge. A battery cell may comprise individual half-cells separated by a porous membrane. Each of the half-cells may comprise at least a conductive electrode and an electrolyte. The electrolyte may be capable of transporting ions. In one or more embodiments, the electrolyte of each half-cell may be different. In one or more embodiments, the electrolyte of the half cells may comprise the same electrolyte. A half-cell may be understood as a partial cell of a battery cell.

Hence, a battery cell may comprise a first half-cell and a second half-cell. The first half-cell and second half-cell may be separated by a porous membrane. The first half-cell may comprise a positive electrode. In one or more embodiments, for a rechargeable battery cell, the positive electrode may function as a cathode during discharge and as an anode during recharge. For a rechargeable battery cell, the negative electrode may function as an anode during discharge and as a cathode during recharge.

The electrolyte for a battery cell may, for example, comprise a solid, a liquid and/or a gel. In one or more embodiments, the electrolyte may comprise a non-solid electrolyte. In one or more embodiments, the electrolyte may comprise a liquid electrolyte and/or a gel electrolyte. In one or more embodiments, the electrolyte may comprise a liquid electrolyte. In one or more embodiments, the electrolyte may comprise a gel electrolyte. In one or more embodiments, the gel electrolyte may comprise a polymer material.

As an example, a rechargeable lithium ion battery cell may comprise a positive electrode comprising, for example, a lithium-containing transition metal oxide or the like, a negative electrode comprising, for example, a carbon material, and a non-aqueous electrolyte as well as a separator membrane which is disposed between the positive and the negative electrode.

FIG. 1 schematically illustrates a flow chart of an example manufacturing method 1 or process for providing (for example, forming) a battery (e.g. a battery cell), according to an embodiment.

The process 1 described in the following may use several methods or acts that are well known in semiconductor technology. Accordingly, any of the acts performed with respect to the manufacturing of the battery cell can as well be used for processing an integrated circuit that may be formed on the same chip. The examples shown in the accompanying figures illustrate example acts of manufacturing the battery cell elements only. Nevertheless, as is clearly to be understood, the employed processes or a part of them may as well be used for processing circuit elements integrated with the battery cell, although not being explicitly shown in the figures.

According to embodiments, the method 1 for providing (for example, forming) the battery cell, comprises an act S10 of forming a porous membrane from a portion of a semiconductor substrate. The porous membrane may be capable of separating a first half-cell from a second half-cell of a battery cell. In some embodiments, the semiconductor substrate may be a semiconductor wafer, for example. The porous membrane may comprise channels allowing ions, e.g. Li-ions, and/or the electrolyte itself to move or travel between the first half-cell and the second half-cell. In one or more embodiments, the electrolyte for each of the half-cells may be a gel electrolyte, for example (such as a polymer gel electrolyte). In one or more embodiments, the electrolyte for each of the half-cells may be a liquid electrolyte. In some embodiments, the electrolyte for each of the half cells may be any non-solid electrolyte. The porous membrane may be a (semipermeable) membrane that allows certain molecules or ions, e.g. Lithium ions in case of Li-ion batteries, to pass through it (such as by migration or diffusion).

As will be discussed later, the porous membrane may also be resistant or inert to attack by the electrolyte and/or by the ions being transported by the electrolyte (for example, Lithium ions).

Further, the method 1 may comprise a further optional act S20 of providing, (e.g. by forming) a first half-cell and/or a second half-cell. First and second half-cells have been described above. As noted above, the first half-cell and the second half-cell may each include an electrode as well as an electrolyte. The electrode of the first-half cell may, for example, be a positive electrode (for example, an anode) or a negative electrode (for example, a cathode). Likewise the electrode of the second half-cell may be a negative electrode or a positive electrode (hence, the electrode of the second half-cell may be an opposite electrode of the first half-cell).

The electrode of the first half-cell and/or the electrode of the second half-cell may each be located in a layer (for example, a semiconductor layer) which is separate from the porous membrane. The electrode of the first half-cell may, for example, be formed in a semiconductor substrate (e.g. a semiconductor wafer) which is different from the semiconductor substrate used for the porous membrane. Likewise, the electrode for the second half-cell may, for example, be formed in a semiconductor substrate (e.g. a semiconductor wafer) which is different from the semiconductor wafer of the porous membrane. In some embodiments, the electrode of the first half-cell may comprise a conductive layer (e.g. a metallic layer). The conductive layer may be a foil. Likewise, in some embodiments, the electrode of the second half-cell may comprise a conductive layer (e.g. a metallic layer). The conductive layer may be a foil.

Hence, the battery cell may comprise two or more separate layers. The separate layers may, for example, comprise two or more separate semiconductor substrates. The separate layers may comprise one or more semiconductor layers as well as one or more conductive layers (such as foils, e.g. pouch foils).

In a further optional act S30 of the method 1, the first semiconductor substrate and the at least one further separate layer may be stacked or piled to form the battery (e.g. battery cell). In one or more embodiments, during act S30 the separate layers may be joined.

Hence, some embodiments propose to manufacture or produce one or more battery cells of a battery (e.g. a secondary or rechargeable battery) such as a rechargeable or secondary Li-ion battery, by means of providing structures of the battery (e.g. battery cell) in a stack (pile) of at least two separate layers stacked on top of each other. In embodiments at least the porous separator membrane is formed into a semiconductor substrate layer by making the substrate material porous. In some embodiments the further structures, such as cavities and/or electrodes, of the first half-cell and/or second half-cell are formed into or provided by further separate semiconductor substrate layers. This allows using known semiconductor process technologies and/or placing the battery (e.g. battery cell) in close proximity to integrated circuits which may be integrated into the same semiconductor substrate layers as the battery (e.g. battery cell). Hence, sizes of electronic devices may be further reduced.

Turning now to FIGS. 2a, 2b, and 2c, an example embodiment of the method 1 will be described, where a battery (e.g. battery cell) 20 is provided (e.g. formed) by stacking three different layers. In one example, at least two of the layers, layer 10 and layer 12, may be provided as separate, e.g. different, semiconductor wafers. Thereby the separate wafers 10, 12 may be wafers which are commonly used in the fabrication of integrated circuits and other micro-devices, respectively. Hence, the separate substrates or wafers 10, 12 may comprise any of the materials described above. For example, the separate substrates may comprise silicon material which may be monocrystalline, polycrystalline or amorphous. The silicon material may be doped with any dopant as is conventionally used such as boron (B), arsenic (As), phosphorus (P) or antimony (Sb). The third layer is provided by a flexible, conductive layer, e.g. a foil, in this embodiment.

Referring first to FIG. 2a, FIG. 2a shows processing acts 510 of forming a porous membrane 16. In some embodiments the acts S10 of forming a porous membrane 16 from at least a portion of a first layer/substrate 10 (e.g. a first semiconductor layer/substrate) may comprise transforming the portion of the layer/substrate 10 into the porous membrane 16. The transformation may, for example, be a chemical transformation which may be achieved by applying a chemical to the layer/substrate 10. In some embodiments, the transformation may be achieved in other ways, such as by applying heat or electromagnetic radiation. The acts S10 may thus include the act of transforming (for example, chemically transforming) a semiconductor material to a porous membrane.

Referring to FIG. 2a, FIG. 2a shows a sequence of processing acts S10 that include acts S11, S12, and S13. Referring to processing act S11, a semiconductor layer/substrate 10 is provided. The layer/substrate 10 may, for example, be a semiconductor wafer. Referring to act S12, the act S12 shows that masking layers 14 are provided (e.g. formed) over both sides of the first layer/substrate 10. The act S12 also shows each of the masking layers 14 are patterned by removing portions of the layers 14. Lithographic methods for defining a position of certain structures and etching may typically be used in micro-fabrication to chemically remove layers from a surface of the layers/substrates 10 during manufacturing.

Referring to act S12, act S12 shows that first layer/substrate 10 may then be etched by one or more etchants 15 so as to form cavities 17-1 and 17-2 on both sides of the layer/substrate 10. The cavities 17-1 and 17-2 may, for example, be trenches or holes. Generally, they may have any lateral cross-sectional shape.

The etching to form the cavities 17-1 and 17-2 may be performed by means of conventional wet and/or dry (plasma) etching processes using respective etchants 15, such as liquid-phase ("wet") or plasma-phase ("dry") etchants. It is observed that in the embodiment shown the openings 17-1 and 17-2 do not go all the way through the layer/substrate 10.

As can be further seen from the process overview of FIG. 2a, forming the porous membrane 16 from at least a portion of the first layer/substrate 10 (S10) may also comprise forming (e.g. etching) at least a part of a first cavity 17-1 for a first half-cell 26-1 into a first (e.g. top) surface of the first substrate 10, such that a bottom of the first cavity 17-1 is defined by or made of substrate material below the first surface (see S13). That is to say, the first cavity 17-1 may not reach through the whole substrate 10. Instead, its depth may be smaller than the substrate's thickness, which may be in the range of 100 µm to 200 µm for example. Further, at least a part of a second cavity 17-2 corresponding to a second half-cell 26-2 may be formed (etched) into a second (e.g. bottom) surface of the first substrate 10 opposite the first surface, such that a bottom of the second cavity 17-2 is provided by a layer 16 of substrate material separating the first cavity 17-1 from the second cavity 17-2. Again, the second cavity 17-2 may not reach through the whole substrate 10. Instead, its depth may also be smaller than the substrate's thickness. A volume of the first and/or second cavities 17-1, 17-2 may be dependent on the pursued battery (e.g. battery cell) capacity.

Referring now to act S13, S13 shows the formation of the porous membrane 16. The porosity of at least a portion of the layer/substrate 10 is increased. In some embodiments, act S13 may be achieved by increasing the porosity of a semiconductor material.

In some embodiments, the porosity may be increased by electrochemically etching the layer/substrate 10. Depending on the type of etching, the type and/or concentration of a dopant in the semiconductor, porous layers of differing thickness, porosity, and structural dimensions (e.g. pores from some nm to some µm of diameter) may be obtained. For example, porous silicon layers may be manufactured by anodization of silicon wafers in hydrofluoric acid/ethanol/water ($HF/EtOH/H_2O$) and hydrofluoric acid/surfactant/water ($HF/Decon/H_2O$) electrolytes. Physical parameters such as thickness and porosity of the formed porous silicon may be determined as a function of concentrations of HF, EtOH, Decon, respectively. For example, higher HF may decrease, while higher EtOH may increase the porosity and may help to produce both uniform anodization and porous silicon layers. Of course, other processes are also possible to obtain porous silicon.

During an optional further manufacturing act, at least a surface portion of the porous membrane 16 may be oxidized. In some embodiments, the oxidation of the porous membrane may oxidize at least a portion of the porous material (for example, at least a portion of the material bulk may be oxidized). In some embodiments, substantially all of the material of the porous membrane 16 may be oxidized completely. In some embodiments, at least 25% (e.g. by volume) of the material of the porous membrane 16 may be oxidized. In some embodiments, at least 50% (e.g. by volume) of the material of the porous membrane 16 may be oxidized. In some embodiments, more than 50% (e.g. by volume) of the material of the porous membrane 16 may be oxidized. In some embodiments, at least 75% (e.g. by volume) of the material of the porous membrane 16 may be oxidized. In some embodiments, at least 90% of the material of the porous membrane 16 may be oxidized. In some embodiments, substantially all of the material of the porous membrane 16 may be oxidized.

The oxidation may help to at least partially prevent emplacement of ions (e.g. Lithium ions) into the porous membrane 16. That is to say, by oxidizing the porous membrane 16, the porous membrane 16 may be made to be chemically inert. In case in which the layer/substrate 10 comprises Si, the oxidation of the porous membrane 16 may transform the Si into a glass (e.g. silicon glass). The silicon glass may, for example, be silica. The glass may, for example, comprise $SiO_x$. The $SiO_x$ may, for example, comprise $SiO_2$. In one or more embodiments, the porous membrane 16 may comprise Si. The oxidation of the porous membrane 16 may transform the Si into $SiO_x$. In one or more embodiments, the $SiO_x$ may comprise $SiO_2$.

Due to the oxidation of the porous membrane 16, also the remaining first layer/substrate 10 may be covered by a thin layer of oxide. That is to say, the method for forming the battery (e.g. battery cell) 20 may comprise, oxidizing at least a material surface of the porous membrane 16. The oxidization may comprise a thermal oxidation.

In one embodiment, the oxidation of the porous membrane 16 may result in the oxidation of only a material surface of the porous membrane 16. However, in some embodiments, the oxidation of the porous membrane may result in the oxidation into the bulk of the porous membrane. In some embodiments, a predominant portion of the porous membrane material may be oxidized. In some embodiments, substantially all of the porous membrane may be oxidized. In some embodiments, at least 25% of the porous membrane may be oxidized. In some embodiments, at least 50% of the porous membrane may be oxidized. In some embodiments, more than 50% of the porous membrane may be oxidized. In some embodiments, at least 75% of the porous membrane may be oxidized. In some embodiments, at least 90% of the porous membrane may be oxidized. In some embodiments, the percentages indicated are by volume of the porous membrane (e.g. by volume of the porous membrane material).

The oxidation of the porous membrane may be achieved in different ways. In one or more embodiments, the oxidation may comprise a wet oxidation process. In one or more embodiments, the oxidation process may comprise the application of one or more chemicals. For example, oxidation may be achieved with the use of HCl and ethanol. In one or more embodiments, the oxidation process may comprise a dry oxidation process. In one or more embodiments, the oxidation process may comprise a thermal process. For example, the oxidation may be achieved by heating the porous membrane material. In one or more embodiments, the oxidation process may comprise a plasma process (for example, plasma oxidation). The plasma oxidation may occur in an oxygen plasma.

In one or more embodiments, the oxidation process may comprise a wet and/or dry oxidation process. In one or more embodiments, the oxidation process may comprises only one or more wet processes. In one or more embodiments, the oxidation process may comprise only one or more dry processes.

In one or more embodiments, the oxidation process may comprise a chemical process and/or a thermal process and/or a plasma process. In one or more embodiments, the oxidation process may comprise a thermal process and/or a plasma process. In one or more embodiments, the oxidation process may comprise a thermal process. In one or more embodiments, it may be possible that the use of a chemical process alone to oxidize the porous membrane may not be sufficient to achieve sufficient oxidation to protect the porous membrane from its environment (e.g. from its chemical environment).

It is noted that the oxidation process may make the porous membrane inert to attack by certain ions and/or certain electrolytes. For example, it may help make the porous membrane inert from attack by Li ions. It may also help to make the porous membrane inert from attack by Na ions.

It is noted that there may be other ways to make the porous membrane inert from attack by ions (e.g. Li ions and/or other ions such as Na ions) and/or from attack by the electrolyte.

FIG. 3 illustrates some example manufacturing acts for forming (S10) the porous membrane 16.

During a first manufacturing act a) illustrated in FIG. 3 a first cavity 17-1 may be etched into a front face of the Si wafer 10 in order to obtain some space for the electrolyte. During a further manufacturing act b) illustrated in FIG. 3 a porous portion/layer 16 may be etched (electro-chemically) into the first cavity 17-1 or the bottom thereof. During a further manufacturing act c) illustrated in FIG. 3 the porous layer 16 may be oxidized completely or at least to a great extend in order to avoid a later emplacement of ions (e.g. Lithium ions) in the porous layer or membrane 16. In one or more embodiments, oxidizing the porous layer 16 may make it chemically inert. In case of a silicon wafer 10 the oxidization of the porous Si layer 16 may result in a porous layer of $SiO_x$, e.g., porous glass, such as $SiO_2$, for example. Due to the oxidization of the porous layer 16 also the remaining wafer may be covered by a thin layer of oxide. That is to say, the method for providing the battery (e.g. battery cell) 20 may comprise, while or after providing the porous membrane 16 within the first substrate 10, oxidizing a material surface of the formed porous portion/layer 16, such that at least a surface of the porous membrane 16 comprises an oxidized semiconductor material. The oxidization act c) illustrated in FIG. 3 may comprise a thermal oxidation of the substrate material according to some embodiments.

According to the manufacturing act d) illustrated in FIG. 3, a second cavity 17-2 may be etched into the rear face of the wafer 10 such as to provide a space for the electrolyte in the second half-cell, to reveal the porous layer 16, and to keep the layer 16 as the porous membrane. An etchant, as for example tetramethylammonium hydroxide (TMAH), used at least for act d) of FIG. 3, may selectively remove Si and keep the glass ($SiO_x$) of layer 16.

The porous membrane 16 may be disposed between the two openings 17-1, 17-2 that are on opposite sides of the layer 10. The porous layer 16 in between the two adjacent cavities 17-1, 17-2, which has a smaller height or thickness than the first substrate 10, corresponds to a material area in which the porous membrane 16 is formed as a separator between the first and the second half-cells 26-1, 26-2 of the galvanic or battery cell 20 (as shown in FIG. 4). While the first substrate 10 may have an overall thickness of about 150 µm, for example, the porous membrane 16 may have a thickness of about 50 µm. Hence, the first and/or the second cavity 17-1, 17-2 may respectively have a depth of about 50 µm as well. Larger or smaller dimensions are well possible. The porous separator membrane 16 may be formed into the bottom of the first and/or second cavity 17-1, 17-2, respectively, such that the bottom of the first and/or second cavity 17-1, 17-2 is provided or formed by the porous membrane 16. In other words, the porous separator membrane 16 delimits or separates the first half-cell 26-1 from the second half-cell 26-2.

Referring to FIG. 2b, according to some embodiments the optional act S20 of providing further parts of the first half-cell and/or the second half-cell may comprise forming, in the at least one separate second layer/substrate 12, at least one electrode structure 18 for at least one of the half-cells 26-1, 26-2. This is schematically illustrated by optional manufacturing acts S21 to S23 of FIG. 2b.

For providing the electrode structure 18 a cavity 19 may be formed in the surface of the substrate 12 (S22). The cavity 19 may be formed by generally known etching methods used in semiconductor fabrication, for example wet-chemical etching using potassium hydroxide (KOH) for providing inclined side surfaces of the cavity 19 depending on the crystal direction if a substrate or carrier 12 of monocrystalline silicon is used. Nevertheless, as is clearly to be understood, alternative etching methods (e.g. dry etching) may be employed. The depth of the cavity 19 may be selected so as to achieve a desired storage capacity of the battery cell, for example. The bottom side of the cavity 19 may form an active silicon surface.

Further, a passivation layer (not shown) which may have the function of a diffusion barrier may be formed or provided over the surface of the substrate 12, while leaving the bottom side of the cavity 19 uncovered. The passivation layer may comprise silicon oxide ($SiO_2$) and/or silicon nitride ($Si_3N_4$), polymers, imids, spin-on-glass (SOG), polyethylene or any combination of these materials. Further examples comprise metals or combinations of metals and the materials mentioned above. During the deposition of the passivation layer, the bottom side of the cavity 19 in the second substrate 12 may be masked by a suitable material so as to prevent the deposition of the passivation layer.

Then, optionally and not illustrated in detail in FIG. 2b, processing to form a three-dimensional structure 21, e.g. a trench structure, in the active surface on the bottom side of the cavity 19 may be performed so as to increase its surface area. This processing may comprise lithographic methods and patterning by etching processes, performing electrochemical processes, wet-chemical processes, forming a native high temperature structure by using a suitable deposition process. Thereby, the insertion of Li ions is facilitated and a mechanical expansion of an electrode material due to an insertion of lithium may be compensated. For example, trenches, pyramids, columns and others may be formed on the bottom side of the cavity 19. For example, these acts may be performed using the passivation layer as a mask.

Thereafter, a thin metal layer may be formed or provided over the exposed silicon material forming the electrode, e.g. an anode. For example, the metal layer may have a thickness about 10 to 100 nm. The material may comprise metals such as Ag, Al, Au, Pd or Pt, which have the possibilities of forming an alloy with lithium. Further examples comprise Zn, Cd, Hg, B, Ga, En, Th, C, Si, Ge, Sn, Pb, As, Sb, Be, Se, Te. For example, the metal layer may be formed by sputtering or by any other deposition process as is generally known. For example, Ag forms an alloy with Li at a voltage of approximately 500 mV, whereas Si forms an alloy at a voltage of approximately 330 mV. Therefore, when applying an Ag-metal layer, an Ag—Li alloy will be formed at the surface of the anode 18 before charging the Si material with lithium so that the Li ions will move to the Si anode in a homogeneous manner. Further, due to the alloy layer, the formation of the native $SiO_2$ layer on the anode surface is prevented so that the transportation of ions is further enhanced. In addition, the insertion of Li atoms in the Si anode will be accomplished in a more homogeneous manner so that the performance of the lithium battery (e.g. battery cell) will be improved. Moreover, due to the presence of the thin metal layer the mechanical stability of the electrode during charging and discharging is enhanced. That is to say, the anode structure 18 may further comprise a layer including a metal disposed on a side of the anode facing the electrolyte, wherein the anode may comprise a component made of silicon.

It has been observed that the charging time will be increased during a first charging cycle. This may be due to the thin metal layer which is present on the surface of the anode structure 18. Nevertheless, after a number of charging cycles, the charging velocity will be equal to the case of employing an anode without a metal layer.

After the porous membrane 16 and the further structures 18, 19, 21 have been formed or provided in the separate layers/substrates 10, 12, the substrates 10, 12 may be stacked on top of each other so as to form the battery (e.g. battery cell) 20 or at least parts thereof by corresponding structures in the stacked substrates 10, 12. This is illustrated by act S30 of FIG. 2c. Thereby stacking the first substrate 10 and the at least one further separate substrate 12 may comprise joining the first and the at least one further separate substrate e.g. by bonding and/or gluing (see reference numeral 24) the separate substrates 10, 12 to each other, as it is known from conventional semiconductor manufacturing processes. In the example of FIG. 2c it can be seen that the second cavity 17-2 in substrate 10 and the cavity 19 in substrate 12 together form a cavity or volume for an electrolyte of the second half-cell 26-2. The first cavity 17-1 in substrate 10 forms a cavity or volume for the electrolyte of the first half-cell 26-1.

In the example of FIG. 2c, the first half-cell 26-1 may be covered by a further electrode structure 22 for providing or forming a cathode, for example. For the cathode, for example, generally known electrical materials which may be used in lithium ion batteries may be employed. Examples comprise $LiCoO_2$, $LiNiO_2$, $LiNi_{1-x}Co_xO_2$, $LiNi_{0.85}Co_{0.1}Al_{0.05}O_2$, $LiNi_{0.33}Co_{0.33}Mn_{0.33}O_2$, $LiMn_2O_4$ spinel and $LiFePO_4$. This electrode structure 22 may be formed into a further separate semiconductor substrate layer or provided by means of a conductive foil, such as a pouch foil, for example.

After having fabricated structures of the battery cell 20, an electrolyte may be filled into the first half-cell and/or the second half-cell 26-1, 26-2. The electrolyte may include electrolytes commonly used for lithium batteries such as salts such as e.g. $LiPF_6$, $LiBF_4$ in water-free aprotic solvents such as propylene carbonate, dimethylcarbonate or 1,2-dimethoxymethane, ethylene carbonate, diethyl carbonate and others, polymers, for example polyvinylidenefluoride (PVDF) or polyvinylidenefluoride hexafluorpropene (PVDF-HFP) or other polymers, $Li_3PO_4N$ and others. For that purpose, as can be seen in the example schematic cross sectional view of FIG. 4, at least one opening 31 to at least one cavity 17-1, 17-2 of the first half-cell and/or the second half-cell 26-1, 26-2 may be provided in the at least one further separate substrate. Then, the electrolyte may be filled into the at least one cavity 17-1, 17-2 through the at least one opening 31. After filling the electrolyte into the at least one cavity the at least one opening 31 may be sealed again.

Hence, embodiments of the described method S1 may yield a battery cell 20, which comprises a porous portion 16 of a semiconductor substrate 10, the porous portion 16 providing or acting as a membrane for separating a first half-cell 26-1 from a second half-cell 26-2 of the battery cell 20, wherein the membrane 16 comprises channels allowing ions and/or an electrolyte to move between the first half-cell and the second half-cell 26-1, 26-2.

According to some embodiments the battery cell 20 may comprise a stack of a plurality of separate substrate layers 10, 12, wherein the porous membrane 16 is provided in a first semiconductor substrate layer 10 of the stack. Thereby further parts of the first half-cell 26-1 and/or the second half-cell 26-2, such as cavities and/or electrodes may be provided or formed in at least one further separate layer 12 of the stack. The least one further separate layer 12, 22 may be realized by further separate semiconductor wafers and/or flexible foils, including pouch foils, for closing the at least one cavity 17-1, 17-2 of the first half-cell and/or the second half-cell 26-1, 26-2 and providing at least one electrode.

Materials of the electrode structure 22 may comprise the examples as mentioned above. Also, the electrode structure 22 may be provided by metallic foils, for example, or it may be manufactured in a third semiconductor substrate by a similar process as has been explained with respect to the second semiconductor substrate 12 and its electrode 18. That is to say, the method 1 for providing the battery cell 20 may also comprise providing a second electrode 22 for the second half-cell in a separate third semiconductor substrate 32 as is illustrated in the example of FIG. 4. The first semiconductor substrate 10 may be arranged in between the second semiconductor substrate 12 and the third semiconductor substrate 32 to obtain the layered substrate stack comprising a three dimensional structure of the battery cell 20, wherein the structure comprises the first half-cell 26-1 with its electrode 22, the second half-cell 26-2 with its electrode 18, and the porous membrane 16 in between the first half-cell and the second half-cell 26-1, 26-2. An embodiment of a resulting stacked battery cell 20 is schematically illustrated by FIG. 4.

As shown by the cross sectional view of FIG. 4, the battery cell 20 comprises a first electrode 22 for the first half-cell 26-1 formed in a separate second (semiconductor) substrate layer 32. A second electrode 18 for the second half-cell 26-2 is formed in a separate third (semiconductor) substrate layer 12. The first (semiconductor) substrate layer 10 is arranged in between the second and third substrate layers 12-1, 12-2 to obtain the stack comprising a structure of the battery cell 20, wherein the structure comprises the first half-cell 26-1 with the first electrode 22, the second half-cell 26-2 with the second electrode 18, and the porous membrane 16 in between the first half-cell 26-1 and the second half-cell 26-2.

FIG. 5 shows a cross-sectional view of an Integrated Circuit (IC) 40 coupled to a battery cell 20.

In FIG. 5, the battery cell 20 may have a structure similar to the structures explained and mentioned above. Here, both electrodes 18, 22 are provided in one example by two separate layers of flexible conductive foils which seal the first half-cell 26-1 and the second half-cells 26-2, respectively. The electrodes 18, 22 are coupled to the integrated circuit 40 in order to provide it with electrical energy. Further, circuit elements 41 to 44 of the integrated circuit 40 may be provided in or on the same semiconductor substrate 10 as the porous membrane 16 of the battery cell 20. For example, the circuit elements 41 to 44 may comprise transistors, resistors, capacitors, MEMS (micro-electro-mechanical system) devices, sensors, energy harvesters, for example, devices which derive energy from external sources (e.g. solar power, thermal energy, wind energy, salinity gradients and kinetic energy), a device for receiving energy, a device for converting energy such as a solar cell, for example, a device for emitting energy such as RFIDs (radio frequency identification devices), a display device, a video device or an audio device, a music player, a signal processing circuit, an information processing circuit, an information storage circuit, or components of any of these devices and others. Further examples of circuit elements 41 to 44 comprise circuits that control a charging or discharging process for the battery cell 20. For example, the circuit elements 41 to 44 may be configured to control charging of the battery cell 20 so that charging is stopped before its complete storage capacity has been reached. The circuit elements 41 to 44 may be formed in the semiconductor substrate 10 or they may be formed in separate layers positioned over the semiconductor substrate 10. In some embodiments the separate layers may be separate semiconductor substrates 12, 32 as well, as has been explained with reference to FIG. 4. Thereby the separate semiconductor substrates 12, 32 may comprise additional three dimensional structures of the battery cell 20, such as further cavities, grooves, wells, and/or electrodes.

The battery cell 20 may be formed in the same semiconductor substrate 10 as the IC 40. Alternatively, at least parts of the battery cell 20 may be formed in a layer placed over the semiconductor substrate 10. An element separation trench 50 may be formed between the battery cell 20 and the IC 40 in order to prevent diffusion of lithium atoms to the integrated circuit 40. The element separation trench 50 may be filled with materials (e.g. silicon oxide and/or silicon nitride) of a passivation layer as mentioned hereinbefore. Depending on the manufacturing method employed, the passivation layer and the element separation trench 50 of the integrated circuit 40 may be made of the same layers.

According to embodiments all elements of a battery cell, however at least the separator membrane, may be fabricated on wafer and may be stacked and coupled to each other. The required cavities and structures may be etched into the respective substrate layer, e.g. Si and/or glass. Then solids needed for the battery cell may be provided to or onto the substrates (e.g. electrodes, connectors, barriers, etc.). The pre-manufactured substrate layers may then by joined by bonding or gluing, for example. After the last high-temperature fabrication acts electrolyte may be provided into the cavities or volumes via openings which may be sealed again afterwards.

It is noted that all of the embodiments presented herein may be applicable to all types of electrochemical cells, including, but not limited to battery cells as well as fuel cells. FIG. 6 shows a block diagram of an embodiment of a fuel cell 60. A fuel cell 60 may include an anode 62, a cathode 64 and an electrolyte 66 between the anode 62 and cathode 64. In certain fuel cells, a porous membrane (such as the porous membrane described herein) may be placed between the anode 62 and the cathode 64 either instead of the electrolyte 66 or possibly in addition to the electrolyte 66. The porous membrane may also serve to conduct ions (for example hydrogen ions) between the anode 62 and cathode 64. A fuel, such as hydrogen gas $H_2$ may be supplied to the anode 62 while an oxidant such as oxygen $O_2$ or air may be supplied to the cathode 64. The fuel may be oxidized at the anode 62 so as to release electrons $e^-$ (with the possible help of a catalyst). The electrons may be conducted externally from the anode 62 to the cathode 64 through the load 68. At the cathode 64, the oxidant may be reduced and the electrons consumed (also with the possible help of a catalyst).

The description and drawings merely illustrate the principles of the disclosure. It will thus be appreciated that those skilled in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and embodiments of the disclosure, as well as specific examples thereof, are intended to encompass equivalents thereof.

Functional blocks shall be understood as blocks comprising circuitry that is configured to perform a certain function, respectively. Hence, a "means for s.th." may as well be understood as a "means configured to or suited for s.th.". A means configured to perform a certain function does, hence, not imply that such means necessarily is performing the function (at a given time instant).

Functions of various elements shown in the figures, including any functional blocks may be provided through the use of dedicated hardware, as well as hardware capable of executing software in association with appropriate software. Moreover, any entity described herein as "means", may correspond to or be implemented as "one or more modules", "one or more devices", "one or more units", etc.

When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the Detailed Description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent or independent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective acts of these methods.

Further, it is to be understood that the disclosure of multiple acts or functions disclosed in the specification or claims may not be construed as to be within the specific order. Therefore, the disclosure of multiple acts or functions will not limit these to a particular order unless such acts or functions are not interchangeable for technical reasons. Furthermore, in some embodiments a single act may include or may be broken into multiple sub acts. Such sub acts may be included and part of the disclosure of this single act unless explicitly excluded.

What is claimed is:

1. A method for making a battery cell in a stack of a plurality of layers, comprising:
   forming, starting from a first surface of a semiconductor substrate layer, at least a part of a first cavity corresponding to a first half-cell into the first surface, such that a bottom of the first cavity is defined by semiconductor material below the first surface;
   transforming semiconductor material forming the bottom of the first cavity into a porous membrane, such that the bottom of the first cavity is provided by the porous membrane;
   forming, starting from a second surface of the semiconductor substrate layer opposite the first surface, at least a part of a second cavity corresponding to a second half-cell into the second surface, such that a bottom of the second cavity is provided by the porous membrane capable of separating the first half-cell from the second half-cell of the battery cell, the porous membrane comprising channels allowing ions and/or an electrolyte to move between the first half-cell and the second half-cell; and
   forming further parts of the first half-cell and the second half-cell in a second separate layer and a third separate layer, respectively, wherein forming further parts of the first and the second half-cells comprises:
      providing a first electrode that extends over the first cavity for the first half-cell in a separate second layer;
      providing a second electrode that extends over the second cavity for the second half-cell in a separate third layer; and
   stacking the semiconductor substrate layer and the second and third separate layers to obtain the battery cell or at least parts thereof by arranging the semiconductor substrate layer in between the separate second and third separate layers to obtain the stack comprising a structure of the battery cell, the structure comprising the first half-cell with the first electrode over the first cavity and defining a space between the first electrode and the bottom of the first cavity, the second half-cell with the second electrode over the second cavity and defining a space between the second electrode and the bottom of the second cavity, and the porous membrane in between the first and the second half-cell,
   wherein the second separate layer and the third separate layer are formed by a separate semiconductor wafer and/or a separate conductive foil.

2. The method of claim 1, wherein transforming the semiconductor material includes a chemical process.

3. The method of claim 1, wherein transforming the semiconductor material includes a thermal process.

4. The method of claim 1, wherein transforming the semiconductor material includes increasing a porosity of the semiconductor material.

5. The method of claim 1, wherein transforming the semiconductor material includes transforming the material into a material which is inert to the ions and/or the electrolyte.

6. The method of claim 1, wherein transforming the semiconductor material includes oxidizing the semiconductor material.

7. The method of claim 6, wherein transforming the semiconductor material comprises transforming a portion of the semiconductor material, and includes oxidizing substantially all of the portion of the semiconductor material.

8. The method of claim 6, wherein oxidizing the semiconductor material includes heating the semiconductor material.

9. The method of claim 6, wherein oxidizing the semiconductor material includes oxidizing at least 50% by volume of the semiconductor material.

10. The method of claim 1, wherein the electrolyte is a non-solid electrolyte.

11. The method of claim 1, wherein the electrolyte includes a gel electrolyte.

12. The method of claim 1, wherein the semiconductor material comprises silicon.

13. The method of claim 1, wherein the battery cell is a rechargeable battery cell.

14. The method of claim 1, wherein the battery cell is a Lithium ion battery cell and the porous membrane allows Lithium ions in the electrolyte to move between the first half-cell and the second half-cell of the lithium ion battery cell.

15. The method of claim 1, wherein the semiconductor material forms at least a portion of a semiconductor substrate.

16. The method of claim 1, wherein forming the first and/or the second cavity comprises etching at least the part of the first and/or the second cavity into a surface of the semiconductor substrate layer.

17. The method of claim 1, wherein stacking comprises joining the semiconductor substrate layer and the at least one further separate layer by bonding and/or gluing the separate layers to each other.

18. The method of claim 1, further comprising:
  providing, in the at least one further layer, at least one opening to at least one cavity of the first and/or the second half-cell;
  filling the electrolyte into the at least one cavity through the at least one opening; and
  after filling the electrolyte into the at least one cavity, sealing the at least one opening.

19. The method of claim 1, wherein the first and second electrodes are continuous over an entirety of the first and second cavities, respectively.

* * * * *